United States Patent
Falk et al.

(10) Patent No.: US 9,674,164 B2
(45) Date of Patent: Jun. 6, 2017

(54) METHOD FOR MANAGING KEYS IN A MANIPULATION-PROOF MANNER

(75) Inventors: Rainer Falk, Poing (DE); Carsten Sattler, Magdeburg (DE); Matthias Seifert, Braunschweig (DE)

(73) Assignee: Siemens Aktiengesellschaft, Munich (DE)

( * ) Notice: Subject to any disclaimer, the term of this patent is extended or adjusted under 35 U.S.C. 154(b) by 225 days.

(21) Appl. No.: 13/882,238

(22) PCT Filed: Oct. 24, 2011

(86) PCT No.: PCT/EP2011/068491
§ 371 (c)(1),
(2), (4) Date: Apr. 29, 2013

(87) PCT Pub. No.: WO2012/055794
PCT Pub. Date: May 3, 2012

(65) Prior Publication Data
US 2013/0212378 A1    Aug. 15, 2013

(30) Foreign Application Priority Data

Oct. 29, 2010  (DE) .......................... 10 2010 043 102

(51) Int. Cl.
*H04L 29/06*    (2006.01)

(52) U.S. Cl.
CPC ........ *H04L 63/061* (2013.01); *H04L 63/0272* (2013.01); *H04L 63/0428* (2013.01); *H04L 63/06* (2013.01); *H04L 63/0884* (2013.01)

(58) Field of Classification Search
USPC ............................... 726/34–36; 713/155–159
See application file for complete search history.

(56) References Cited

U.S. PATENT DOCUMENTS

| | | | |
|---|---|---|---|
| 6,292,898 B1 * | 9/2001 | Sutherland | ...................... 726/34 |
| 6,549,626 B1 * | 4/2003 | Al-Salqan | ...................... 380/286 |
| 7,783,901 B2 * | 8/2010 | Carrico et al. | .................. 726/35 |
| 2002/0191548 A1 | 12/2002 | Ylonen et al. | |
| 2003/0204732 A1 * | 10/2003 | Audebert | ............ H04L 63/0846 713/182 |

(Continued)

FOREIGN PATENT DOCUMENTS

| | | |
|---|---|---|
| CN | 1738280 A | 2/2006 |
| DE | 102010041804 A1 | 4/2012 |
| WO | 02078290 A1 | 10/2002 |

OTHER PUBLICATIONS

Hardware Security Modules F. Demaertelaere SecAppDev 2010.*

*Primary Examiner* — Michael R Vaughan
*Assistant Examiner* — Vadim Savenkov
(74) *Attorney, Agent, or Firm* — Laurence Greenberg; Werner Stemer; Ralph Locher

(57) ABSTRACT

A method manages keys in a manipulation-proof manner for a virtual private network. The method includes authenticating a communication terminal on an authentication server by use of a first key over a public network and providing a communication key, which is suitable for the communication over a virtual private network in the public network, for the authenticated communication terminal over the public network. The communication key in the communication terminal is encrypted by a second key, which is provided by a manipulation-protected monitoring device.

13 Claims, 3 Drawing Sheets

(56) References Cited

U.S. PATENT DOCUMENTS

| | | |
|---|---|---|
| 2005/0166002 A1 | 7/2005 | Wallace et al. |
| 2006/0136717 A1* | 6/2006 | Buer et al. .................... 713/155 |
| 2006/0161791 A1* | 7/2006 | Bennett ............... G06F 12/1408 |
| | | 713/193 |
| 2007/0255966 A1* | 11/2007 | Condorelli et al. .......... 713/194 |
| 2008/0155278 A1 | 6/2008 | Carrico et al. |
| 2008/0216147 A1* | 9/2008 | Duffy ................................ 726/1 |
| 2010/0037311 A1 | 2/2010 | He et al. |
| 2010/0268943 A1* | 10/2010 | Roy-Chowdhury et al. . 713/156 |
| 2012/0246463 A1* | 9/2012 | Shea ..................... H04L 63/061 |
| | | 713/153 |

* cited by examiner

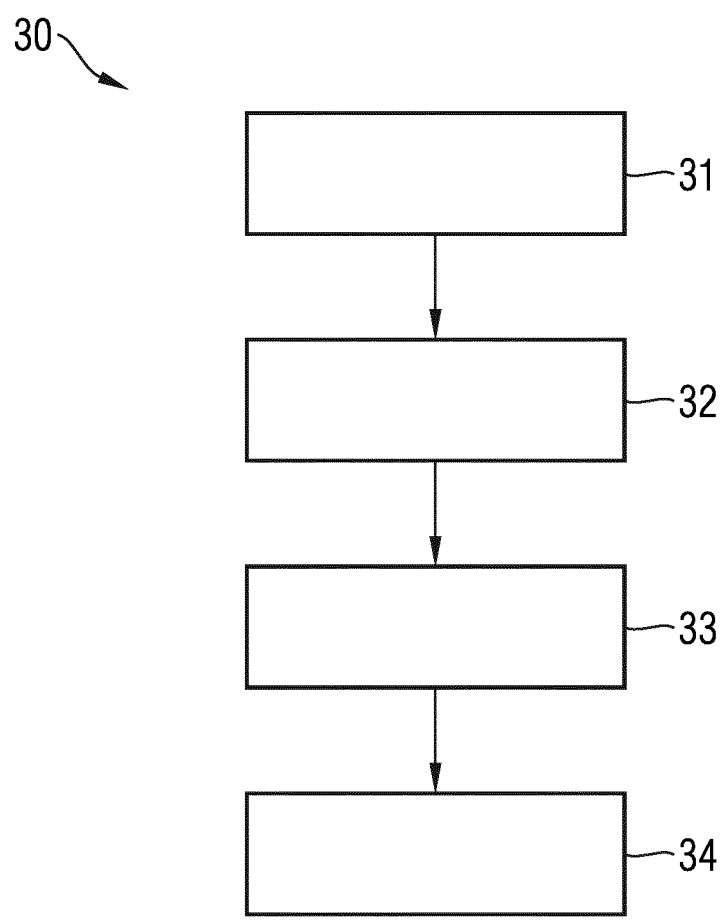

METHOD FOR MANAGING KEYS IN A MANIPULATION-PROOF MANNER

BACKGROUND OF THE INVENTION

Field of the Invention:

The present invention relates to a method for managing keys in a manipulation-proof manner, in particular for a virtual private network.

PRIOR ART

Industrial field devices such as for example control devices for rail and track systems communicate increasingly frequently by way of open communication protocols such as TCP/IP instead of proprietary protocols. They therefore use public networks such as the internet to transmit communication data to a central unit or other field devices. To protect data transmission against manipulation, cryptographic protection mechanisms, such as SSL/TLS or IPsec for example, are utilized.

However it is often not practical to equip field devices themselves with such network technology, so external devices are generally used to set up virtual private networks (VPN) for field devices to communicate by way of public networks such as the internet and to ensure the required security. Such external devices have to be configured with cryptographically secured data for communication. A secret cryptographic communication key is required for this purpose, which can be used to encrypt and decrypt data sent and received by way of the VPN.

Configuration of the external devices can be complex, in particular if reconfiguration is required after an error has occurred. One possibility is to locate and reconfigure the external devices in situ but this is very time-consuming. A further possibility is to reconfigure the external devices independently but this involves certain security risks for the configuration data stored in the external devices.

There is therefore a need for a method for managing keys for an external VPN for field devices, with which a high level of security is ensured for the cryptographic data while still keeping configuration simple.

SUMMARY OF THE INVENTION

One embodiment of the present invention consists of a method for managing keys in a manipulation-proof manner for a virtual private network, in which authentication of a communication terminal takes place on an authentication server with the aid of a first key by way of a public network. Once authentication has been completed, a communication key, which is suitable for communication by way of a virtual private network in the public network, is provided for the authenticated communication terminal by way of the public network. The communication key is then encrypted in the communication terminal with the aid of a second key, which is provided by a manipulation-protected monitoring facility. This method has the advantage that it is possible to configure a communication terminal for communication in a virtual private network by way of a public network, without endangering the security of the cryptographic data required for communication by way of the virtual private network against manipulation at the communication terminal.

An inventive method advantageously comprises the detection of manipulation operations at the manipulation-protected monitoring facility and the cancellation of the second key if a manipulation operation is detected at the manipulation-protected monitoring facility. This has the advantage that if the virtual private network is attacked, the cryptographic data can reliably be made unusable on the communication terminal side.

The communication key encrypted with the aid of the second key is advantageously stored in a storage unit, so that decryption of the stored communication key by the communication terminal is only possible with the aid of the second key.

In one preferred embodiment of the method the energy supply status of the manipulation-protected monitoring facility is monitored and the second key is canceled, if the energy supply in the manipulation-protected monitoring facility is inadequate. This allows the security of the cryptographic data to be ensured even if the power supply fails.

According to a further embodiment of the present invention an apparatus for managing keys in a manipulation-proof manner for a virtual private network comprises a communication terminal having a first key, the communication terminal being designed to authenticate itself on an authentication server with the aid of the first key by way of a public network and to communicate by way of a virtual private network in the public network with a communication key provided by the authentication server, a monitoring facility, which is designed to provide a second key, to detect manipulation operations at the apparatus and, if a manipulation operation is detected, to cancel the second key, and a storage unit, which is designed to store the communication key encrypted with the aid of the second key. The inventive apparatus advantageously allows field devices to communicate securely by way of a virtual private network in a public network, without the security of the cryptographic data required for the virtual private network being endangered in the event of manipulation at the apparatus.

The communication terminal can advantageously only access the encrypted communication key stored in the storage unit with the aid of the second key.

According to one embodiment the apparatus comprises an energy supply facility, which supplies the monitoring facility and the communication terminal with energy, and an energy storage unit, which is connected to the energy supply facility and is designed to supply the monitoring facility temporarily with energy if the energy supply from the energy supply facility is interrupted. The security of the cryptographic data can therefore be ensured even if the power supply fails, as the monitoring facility can operate at least temporarily independently of the main energy supply and can initiate any necessary securing measures.

Further modifications and variations will emerge from the features of the dependent claims.

BRIEF DESCRIPTION OF THE FIGURES

Different embodiments and configurations of the present invention are now described in more detail with reference to the accompanying drawings, in which

FIG. 3 shows a diagram of a method for managing keys in a manipulation-proof manner according to a further embodiment of the invention.

Figure 1:
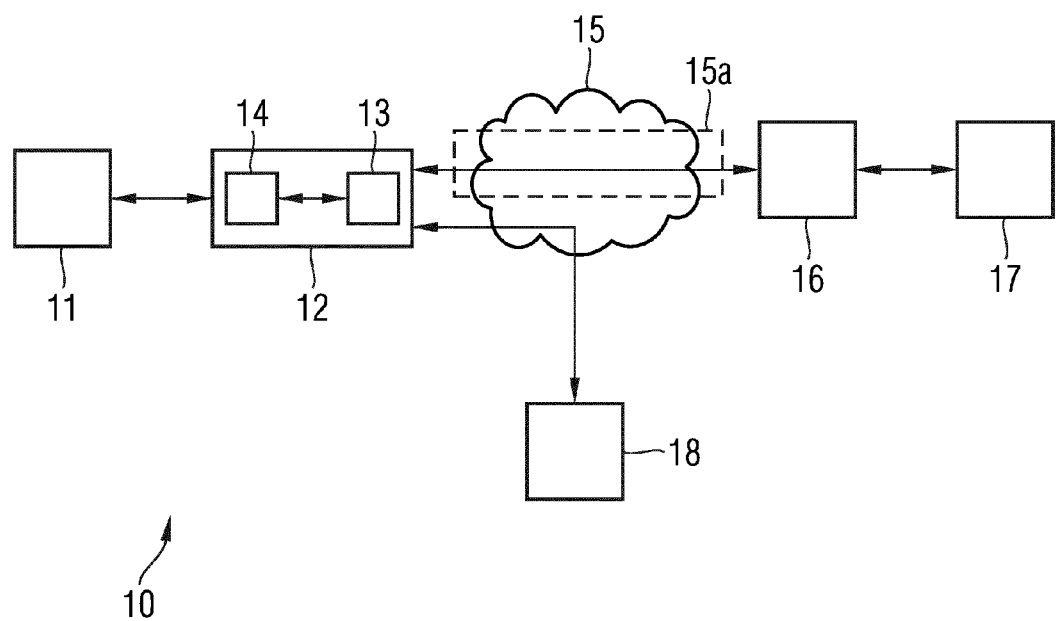
FIG. 1 shows a schematic diagram of a VPN environment according to an embodiment of the invention.

The described embodiments and developments can be combined in any manner with one another as far as this is expedient. Further possible embodiments, developments and implementations of the invention also comprise not specifically cited combinations of features of the invention described above or in the following in relation to the exemplary embodiments.

The accompanying drawings are intended to provide a better understanding of the embodiments of the invention. They show embodiments and serve in conjunction with the description to explain principles and concepts of the invention. Other embodiments and many of the cited advantages will emerge in respect of the drawings. The elements of the drawings are not necessarily shown in scale with one another. Identical reference characters here designate identical components or components of comparable effect.

DETAILED DESCRIPTION OF THE INVENTION

FIG. 1 shows a schematic diagram of a VPN environment 10 according to an embodiment of the invention. The VPN environment 10 comprises a field device 11. The field device 11 can be for example a control device for a rail or track system, for example for a switch, barrier or signal. However the field device 11 can be any other remote device, for example a weather station or traffic signal. So that the field device 11 can exchange control messages and control data with a central station 17, for example a signal box, a communication facility 12 is present, which is connected to the field device 11 and communicates by way of a network 15 with a remote station 16, which for its part is connected to the central station 17. The communication facility 12 can be in the form of an external device or it can be integrated in the field device 11.

The control data is transmitted by way of the network 15, which can be a public network, for example the internet, a mobile radio network, for example UMTS, LTE or WiMAX, a wireless network, for example WLAN, an Ethernet network, a token ring network or any other comparable network. The control data, which is transmitted by way of the network 15, is therefore exposed to potential attacks. Therefore a virtual private network 15a (VPN) is set up for communication between the communication facility 12 and the remote station 16, by way of which data can be sent and received with cryptographic protection by way of corresponding encryption. Any known encryption technology, for example IPsec, IKE, EAP, SSL/TLS, MACsec, L2TP, PPTP, PGP, S/MIME or similar technologies, can be used for encryption. Encryption here can be embodied as a calculation of a cryptographic checksum (message authentication code, digital signature) and decryption can be embodied as the checking of a cryptographic checksum.

The communication facility 12 therefore has one (or more) communication key(s), with which the control data of the field device 11 to be sent is cryptographically encrypted and the data to be received for the field device 11 is cryptographically decrypted. A communication key can be used directly. Similarly the communication key can be used in an authentication and key agreement protocol, for example the IKE protocol, to set up a session key. The set up session key can then be used for the cryptographically protected transmission of control messages or control data with the remote station 16. The communication facility 12 comprises a communication terminal 13, which can be a microprocessor for example, which can set up communication by way of the network 15 by way of corresponding communication interfaces. In particular the communication terminal 13 can be designed to set up a VPN. The communication facility 12 also comprises a manipulation-protected monitoring facility 14, a so-called tamper watchdog. The manipulation-protected monitoring facility 14 and its mode of operation are described in more detail below in conjunction with FIG. 2.

The VPN environment 10 further comprises a server 18, which has so-called bootstrapping functions, for example an authentication server. Bootstrapping refers to mediation between terminals and servers that were previously unknown to one another, permitting the unilateral or mutual authentication and—based on this—the exchange of secret keys, which allows an extended use of applications which require authentication and a secured communication relation. The server 18 has an address, for example an IP address or URL, which is permanently programmed in the communication facility 12 or can be varied. In one embodiment the address of the server 18 is an address of the manufacturer of the communication facility 12. In a further embodiment the address of the server 18 is an address of the operator of the communication facility 12. It may however also be possible first to determine a further address of a server 18 responsible for the respective communication facility 12 by way of another address of the communication facility 12 and then to set up the further address for setting up a bootstrapping connection with the server 18. It may be possible here to consult a database for the selection of the server 18 associated respectively with a communication facility 12. It may also be possible to make the selection of the address of the corresponding server 18 a function of a physical location of the field device 11, for example GPS data or other spatial coordinates. The server 18 can also be integrated in the remote station 16 or it may be possible for the remote station 16 to have corresponding bootstrapping functionality. In one variant the server 18 can also be connected directly to the communication facility 12. It should be evident that there is a plurality of further possibilities for allocating a server 18 for a respective communication facility 12.

A VPN configuration for example comprises information about the address of the server 18, the address of the remote station 16, a public key or a digital certificate of the remote station 16, the VPN protocol to be used, a description of the security settings, for example the key and the mode for the respective VPN connection 15a and/or filter rules relating to permissible data traffic. This information can be present as text, for example as attribute value pairs, or as an XML document. It may also be possible to set up a number of VPN connections 15a for a field device 11, in order for example to implement different types of traffic, for example control, monitoring, maintenance access and similar functions, in separate VPN connections 15a.

Figure 2:
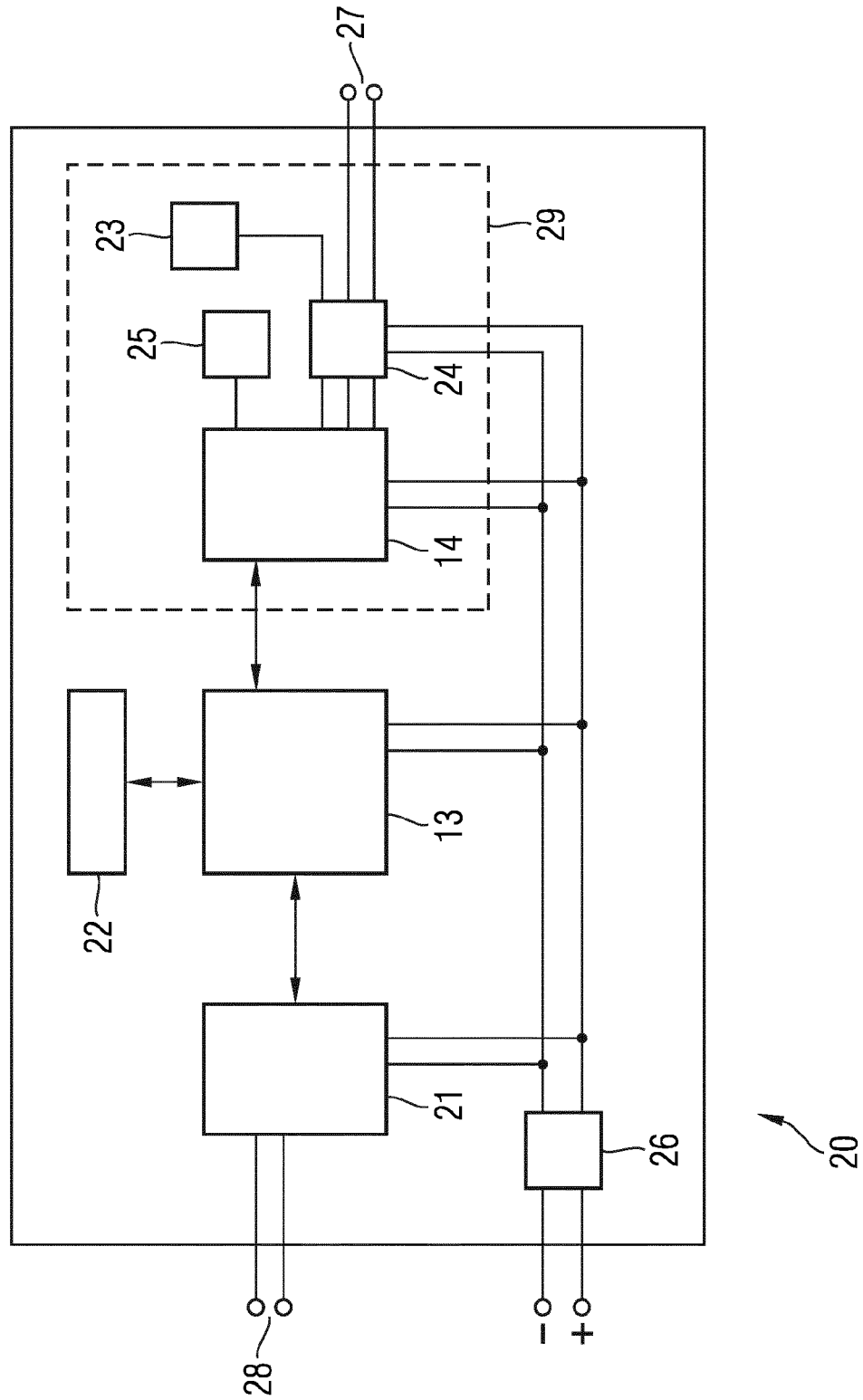
FIG. 2 shows a schematic diagram of a field device with an apparatus for setting up a VPN according to a further embodiment of the invention.

FIG. 2 shows a schematic diagram of a field device 20 having an apparatus for setting up a VPN according to a further embodiment of the invention. The field device 20 comprises a communication terminal 13, a manipulation-protected monitoring facility 14, a communication interface 21 with communication inputs and outputs 28, a storage unit 22 and an energy supply facility 16.

The communication terminal 13 is connected to the manipulation-protected monitoring facility 14, the communication interface 21 and the storage unit 22. The communication terminal 13 can be for example a computation unit/control unit, such as a microprocessor for example, which can set up communication, in particular VPN communication with a higher-order master computer, for example the central station 17 in FIG. 1, by way of communication inputs and outputs 28 by way of the communication interface 21. The communication interface 21 can be designed to set up connections to different networks, for example the internet, a mobile radio network, for example UMTS, LTE or WiMAX, a wireless network, for example WLAN, an Ethernet network, a token ring network or any other comparable network. Provision can be made for the field device 20 to have a number of different communication interfaces 21, which can be activated by way of the communication terminal 13.

The storage unit 22 can be for example a storage module, in which configuration settings of the communication terminal 13 can be stored in a permanent and rewritable manner, for example a serial EEPROM, a flash memory or a comparable storage facility. In particular the storage unit 22 is designed to store configurable and non-configurable keys. Storage is effected by way of the communication terminal 13.

The communication terminal 13 is connected to a manipulation-protected monitoring facility 14, for example a tamper watchdog. The manipulation-protected monitoring facility 14 can comprise for example an integrated circuit, a programmable logic module, for example a GAL or FPGA, or a microprocessor. The manipulation-protected monitoring facility 14 can be connected to an input/output interface 24, by way of which communication with the outside world is possible by way of input/output ports 27 and to which further devices, for example a sensor 23, can be connected. The sensor 23 can be a tamper sensor, in other words a sensor that can identify physical manipulation at the field device 20 or at parts of the field device 20. In particular the sensor 23 can be designed to monitor the region 29 marked with a broken line within the field device 20. The region 29 can comprise for example the manipulation-protected monitoring facility 14, the sensor 23 itself and the input/output interface 24. It may however also be possible for the region 29 to comprise other components of the field device 20, for example the communication terminal 13, the storage unit 22, the energy supply facility 26 and/or the communication interface 21. It may also be possible to connect a number of sensors 23 to the input/output interface 24, in order to monitor different regions 29 of the field device 20 and/or to be able to detect different physical manipulation operations. The sensor 23 can comprise for example a light barrier, temperature sensor, external switch, magnetic field sensor or similar apparatuses. In particular provision can be made for the field device 20 to be accommodated in a switch cabinet, the door of which can be monitored for unauthorized opening by way of a switching sensor. Similarly a sensor 23 can detect the opening of the housing of the field device 20 or the removal of the field device 20 from a holder. The sensor 23 can be integrated, like the input/output interface 24, in the manipulation-protected monitoring facility 14.

The field device 20 can also have an external energy supply, which can be provided by way of the energy supply unit 26. The energy supply unit 26 can be designed to supply different components of the field device 20 with energy, for example power. In particular the communication terminal 13, the communication interface 21, the manipulation-protected monitoring facility 14 and the input/output interface 24 can be supplied with power.

An energy storage unit 25 can be connected to the manipulation-protected monitoring facility 14, it being possible for energy to be stored therein temporarily to supply energy to the manipulation-protected monitoring facility 14. For example the energy storage unit 25 can be a buffer capacitor, for example a double layer capacitor. The energy storage unit 25 can thus provide power temporarily for supplying energy to the manipulation-protected monitoring facility 14, if the energy supply unit 26 or the external energy supply fails. Provision can be made for example for the manipulation-protected monitoring facility 14 to identify when the energy storage unit 25 has to be accessed to ensure an adequate energy supply. A controlled deactivation and corresponding securing measures for the communication data and keys can then be initiated to ensure the security of the field device 20. The energy storage unit 25 can therefore expediently be selected so that the stored energy is adequate at least for executing the required securing measures. This advantageously allows manipulation monitoring independently of the communication terminal 13 and the energy consumption for such monitoring can be specifically minimized, without thereby compromising the security of the communication data of the field device 20.

The field device 20 can have full or partial physical manipulation protection, for example by being cast with epoxy resin and being provided with manipulation sensors, which can identify manipulation, for example penetration into the casting compound. Such sensors are for example films, so-called tamper meshes. Such films comprise conductor path grids, which can be bonded around devices to be protected. A manipulation attempt on a device protected in this manner triggers interruptions and/or short circuits, which supply a corresponding signal for a sensor. It is possible to equip the field device completely or just partially with the abovementioned manipulation protection measures. It may be advantageous for example just to equip the region 29 in FIG. 2 with corresponding manipulation protection. It should be evident that there is a plurality of possible embodiments for manipulation protection.

FIG. 3 shows a diagram of a method for managing keys in a manipulation-proof manner according to a further embodiment of the invention. The method 30 can be performed here in particular by a field device and a communication facility according to an embodiment of one of FIGS. 1 and 2.

In a first step 31 a communication terminal, for example the communication terminal 13 in FIG. 2, is authenticated on an authentication server, for example a server 18 in FIG. 1, with the aid of a first key by way of a public network. To this end the communication terminal authenticates itself by way of a public network, for example the internet or a mobile radio network. The first key here can be a device key for example, which is specific to the respective communication terminal and can be programmed in for example during manufacture ex works. The first key can be stored in a storage unit, for example the storage unit 22 in FIG. 2.

Communication between the communication terminal and the authentication server can take place in a protected manner for example by way of SSL/TLS. The first key can be an ECC or RSA private key for example. It is however evident that other types of key can also be used for the first key, for example a public/private key pair or a symmetrical key.

In a second step 32 a communication key is provided, which is suitable for communication by way of a virtual private network (VPN) in the public network, for the authenticated communication terminal by way of the public network. VPN configuration settings can be provided here, which include the communication key. The communication key can comprise any type of keys, which are suitable for a VPN connection, for example an IPsec key. The communication key can in particular then be transferred to the communication terminal, if authentication of the communication terminal was successful on the authentication server side. This can include inter alia the verification of the first key and/or the verification of the correct operating status of the communication terminal.

In a third step 33 the communication key is encrypted in the communication terminal with the aid of a second key, which is provided by a manipulation-protected monitoring facility. To this end the manipulation-protected monitoring facility can transfer a parameter TPSP to the communication terminal as the second key. The parameter TPSP can be generated for example by way of a random generator and can have a randomly determined value. The parameter TPSP here can advantageously only remain valid as long as no manipulation attempts are detected by the manipulation-protected monitoring facility and/or an adequate supply of energy to the manipulation-protected monitoring facility is ensured. In the event of manipulation or the energy supply level dropping below a critical energy supply level in the manipulation-protected monitoring facility, the parameter TPSP can be canceled, for example the momentarily valid parameter TPSP can be deleted or overwritten by another randomly generated value TPSP2.

The communication terminal receives the second key, for example the parameter TPSP, from the manipulation-protected monitoring facility and uses it to generate an encryption key TPCEK, which can be used to encrypt the communication key. The parameter TPSP may for example only be received when the communication terminal authenticates itself to the manipulation-protected monitoring facility. It may also be possible for the parameter TPSP to be a function of a parameter provided by the communication terminal, for example a serial number or a device key. The encryption key TPCEK can be a symmetrical key, for example an AES key. The encryption key TPCEK can either directly comprise the parameter TPSP or it can be generated as a function of the parameter TPSP by way of a key derivation in the communication terminal. Known key derivation methods such as SHA-1, HMAC, CBC-MAC or similar methods can be used here. Provision can also be made for other parameters apart from the parameter TPSP to be included in the key derivation for the encryption key TPCEK, for example a fixed character string, stored parameters, hardware parameters such as a field device number or MAC serial number of the communication terminal or similar parameters.

After encryption of the communication key by the communication terminal, the encryption key TPCEK used for the encryption can be deleted in the communication terminal. The encrypted communication key can be stored encrypted in a storage unit. If the communication terminal now has to access the communication key for communication by way of the VPN, the second key, for example the parameter TPSP, must first be requested from the manipulation-protected monitoring facility. As described above, this is only possible if no manipulation attempts have been detected. The encrypted communication key is therefore securely protected against manipulation attempts at the field device.

In a fourth step 34 provision can be made to generate an integrity key with the aid of the second key to verify the integrity of the stored communication key. The integrity key TPCIK here can be formed in the same way as the encryption key TPCEK. Provision can be made in particular to use a different character string as a further parameter for key derivation for the integrity key TPCIK from the one used for the encryption key TPCEK. The integrity key can be used to verify the integrity of the configuration stored in a storage unit, for example the storage unit 22 in FIG. 22.

If a communication terminal ascertains, on activation, for example switching on by applying a supply voltage, that there is no valid and/or decryptable configuration present, for example because incorrect behavior, for example a manipulation attempt or an interruption of the external energy supply, has been detected and the corresponding second key has been canceled by the manipulation-protected monitoring facility, a bootstrapping method is again initiated by way of a VPN connection. Provision can also be made for the manipulation-protected monitoring facility itself to send a warning signal to the communication terminal in the event of a manipulation attempt, so that said communication terminal can then initiate corresponding bootstrapping measures. This has the advantage that, for example after non-critical incorrect behavior such as a power failure, the communication terminal can be automatically reconfigured without the field device having to be configured in situ, thereby saving maintenance personnel a great deal of time and labor. At the same time it is easier with the inventive method to perform a "more aggressive" key deletion, in other words to apply lower thresholds for detecting manipulation attempts or determining an energy under-supply status, as there is generally no need for complex recommissioning with the inventive configuration method.

The invention claimed is:

1. A method for managing keys in a manipulation-proof manner for a virtual private network, which comprises the steps of:
   authenticating a communication terminal on an authentication server with an aid of a first key by way of a public network;
   providing a communication key, being suitable for communication by way of the virtual private network in the public network, for an authenticated communication terminal by way of the public network;
   using a second key, being provided by a manipulation-protected monitoring facility, for generating an encryption key;
   encrypting the communication key using the encryption key;
   deleting the encryption key generated by the communication terminal after an encryption of the communications key; and
   canceling the second key if a manipulation operation is detected via a manipulation-protected monitoring facility.

2. The method according to claim 1, which further comprises storing the communication key encrypted with the aid of the second key.

3. The method according to claim 2, wherein decryption of a stored communication key by the communication terminal is only possible with the aid of the second key.

4. The method according to claim 2, which further comprises generating an integrity key with the aid of the second key to verify an integrity of a stored communication key.

5. The method according to claim 1, which further comprises:
   monitoring an energy supply status of the manipulation-protected monitoring facility; and
   canceling the second key, if an energy supply in the manipulation-protected monitoring facility is inadequate.

6. The method according to claim 1, wherein the communication terminal authenticates itself to the manipulation-protected monitoring facility before receiving the second key.

7. The method according to claim 1, wherein in a case of decrypting the communication key, the communication terminal must first request the second key from the manipulation-protected monitoring facility and generate the encryption key again based on the second key.

8. An apparatus for managing keys in a manipulation-proof manner for a virtual private network, the apparatus comprising:
- a communication terminal having a first key, said communication terminal authenticating itself on an authentication server with an aid of the first key by way of a public network and to communicate by way of the virtual private network in the public network with a non-encrypted communication key provided by the authentication server;
- a monitoring facility, providing a second key, for detecting manipulation operations at the apparatus and, if a manipulation operation is detected, to cancel the second key;
- said communication terminal receiving the second key and generating an encryption key from the second key, the encryption key encrypting the non-encrypted communication key, the encryption key generated by said communication terminal being deleted after an encryption of the non-encrypted communication key; and
- a storage unit for storing an encrypted communication key encrypted with an aid of the second key.

9. The apparatus according to claim 8, wherein said communication terminal and said monitoring facility contain microprocessors.

10. The apparatus according to claim 8, wherein said communication terminal is only to be able to access the encrypted communication key stored in said storage unit with the aid of the second key.

11. The apparatus according to claim 8, further comprising:
- an energy supply facility supplying said monitoring facility and said communication terminal with energy; and
- an energy storage unit, connected to said energy supply facility, and supplying said monitoring facility temporarily with energy if an energy supply from said energy supply facility is interrupted.

12. The apparatus according to claim 11, wherein said monitoring facility cancels the second key, if the energy supply from said energy supply facility is interrupted.

13. The apparatus according to claim 9, wherein said monitoring facility contains a manipulation sensor connected to at least one of said microprocessors.

* * * * *